(12) United States Patent
Coulter

(10) Patent No.: US 12,373,557 B2
(45) Date of Patent: Jul. 29, 2025

(54) METHODS AND SYSTEMS FOR IDENTIFYING ANOMALOUS COMPUTER EVENTS TO DETECT SECURITY INCIDENTS

(71) Applicant: Auguria, Inc., Ladera Ranch, CA (US)

(72) Inventor: Christopher G. Coulter, Stuart, FL (US)

(73) Assignee: Auguria, Inc., Ladera Ranch, CA (US)

( * ) Notice: Subject to any disclaimer, the term of this patent is extended or adjusted under 35 U.S.C. 154(b) by 227 days.

(21) Appl. No.: 18/166,654

(22) Filed: Feb. 9, 2023

(65) Prior Publication Data
US 2023/0252140 A1     Aug. 10, 2023

Related U.S. Application Data

(60) Provisional application No. 63/308,391, filed on Feb. 9, 2022.

(51) Int. Cl.
*G06F 21/55*     (2013.01)
*G06N 3/091*     (2023.01)

(52) U.S. Cl.
CPC .......... *G06F 21/554* (2013.01); *G06N 3/091* (2023.01); *G06F 2221/034* (2013.01)

(58) Field of Classification Search
CPC . G06F 21/554; G06F 2221/034; G06N 3/091; H04L 63/1425; H04L 63/1433; H04L 63/1416; H04L 63/1441; H04L 63/20
See application file for complete search history.

(56) References Cited

U.S. PATENT DOCUMENTS

| | | | |
|---|---|---|---|
| 9,338,013 B2 | 5/2016 | Castellucci et al. | |
| 10,284,587 B1 | 5/2019 | Schlatter et al. | |
| 10,673,880 B1 * | 6/2020 | Pratt | H04L 63/1425 |

(Continued)

FOREIGN PATENT DOCUMENTS

WO    WO-2023154779 A2    8/2023

OTHER PUBLICATIONS

Park et al., "Autoencoder for Network Anomaly Detection," 2022 IEEE International Symposium on Measurements & Networking (M&N) Year: 2022 | Conference Paper | Publisher: IEEE.*

(Continued)

*Primary Examiner* — Roderick Tolentino
(74) *Attorney, Agent, or Firm* — COOLEY LLP

(57) ABSTRACT

A method includes receiving, from a source from a plurality of sources, data associated with an event at the source. The data includes an event timestamp and an event data-frame. The method includes defining a standardized event based on the event by parsing the data to map predefined data fields within the event data-frame based on predefined standardization rules, calculating a representative identifier for the event by providing a representation of the standardized event as an input to a predefined function, defining an identifier for the event based on the representative identifier, calculating a distance of the identifier to an identifier associated with each event cohort from a plurality of event cohorts, assigning the event to an event cohort from the plurality of event cohorts based on the distance meeting a criterion of that cohort, and identifying an anomalous event based on the distance exceeding a predetermined threshold.

22 Claims, 8 Drawing Sheets

(56) References Cited

U.S. PATENT DOCUMENTS

| | | | |
|---|---|---|---|
| 11,182,481 B1* | 11/2021 | Oliver | G06N 20/00 |
| 12,238,119 B1* | 2/2025 | Chivu | H04L 63/20 |
| 2015/0026027 A1 | 1/2015 | Priess et al. | |
| 2015/0199224 A1 | 7/2015 | Mihnev | |
| 2018/0219888 A1* | 8/2018 | Apostolopoulos | H04L 63/1425 |
| 2018/0255084 A1* | 9/2018 | Kotinas | H04L 63/1425 |
| 2019/0319987 A1* | 10/2019 | Levy | H04L 63/08 |
| 2021/0141897 A1 | 5/2021 | Seifert et al. | |
| 2022/0179892 A1* | 6/2022 | Kermode | G06N 3/08 |
| 2022/0277176 A1* | 9/2022 | Bhatia | G06N 3/045 |
| 2022/0292525 A1 | 9/2022 | Ash et al. | |
| 2022/0309087 A1* | 9/2022 | Müller | G06N 3/08 |
| 2022/0368586 A1* | 11/2022 | Stewart | H04L 41/22 |
| 2023/0208869 A1 | 6/2023 | Bisht et al. | |

OTHER PUBLICATIONS

Jarabo-Penas et al., "Bus Headways Analysis for Anomaly Detection," IEEE Transactions on Intelligent Transportation Systems Year: 2022 | vol. 23, Issue: 10 | Journal Article | Publisher: IEEE.*

International Search Report and Written Opinion for International Application No. PCT/US2023/062259, mailed on Jul. 11, 2023, 13 pages.

Invitation to Pay Fee for International Application No. PCT/US2023/062259 dated Apr. 20, 2023, 2 pages.

Joshi et al., "Intelligent clustering scheme for log data streams". In Computational Linguistics and Intelligent Text Processing: 15th International Conference, CICLing 2014, Kathmandu, Nepal, Apr. 6-12, 2014, Proceedings, Part II (pp. 454-465). Springer, Berlin, Heidelberg 2014.

"Science Direct Topics". ScienceDirect Journals & Books [Internet]. Elsevier B.V. c2023. Available from: https://www.sciencedirect.com/topics/computer-science/log-record-event. 8 pages.

Warren "How to Detect Pass-the-Hash Attacks", Internet Archive, The WayBack Machine. [Internet]. web.archive.org; Feb. 2019. 12. Available from: https://web.archive.org/web/20211205071738/https:/stealthbits.com/blog/how-to-detect-pass-the-hash-attacks/, 17 pages.

Briggs, "Unlocking the Power of Ontologies for Advanced Security Analytics—Part 3," retrieved from URL: https://auguria.io/insights/unlocking-the-power-of-ontologies-for-advanced-security-analytics/, Oct. 17, 2024, 13 pages.

International Preliminary Report on Patentability for International Application No. PCT/US2023/062259 mailed Aug. 22, 2024, 7 pages.

International Search Report and Written Opinion for PCT Application No. PCT/US2024/040863 mailed Oct. 18, 2024, 13 pages.

Rochford, "Why Your Next SIEM Will Analyze Vectors—Part 1," retrieved from URL:https://auguria.io/insights/why-your-next-siem-will-analyze-vectors/, Oct. 17, 2024, 12 pages.

Rochford, "Why Your Next SIEM Will Analyze Vectors—Part 2," retrieved from URL:https://auguria.io/insights/why-your-next-siem-will-analyze-vectors-part-2/, Oct. 17, 2024, 15 pages.

* cited by examiner

300

```
Receiving, from a plurality of sources, data associated with a plurality of events at
the plurality of sources
302
                            │
                            ▼
Standardizing the data based on a set of predefined standardization rules to
define standardized data
304
                            │
                            ▼
Defining a vector representation of the standardized data
306
                            │
                            ▼
Applying a locality sensitive hashing (LSH) function on the standardized data
308
                            │
                            ▼
Transforming, by a machine learning model, the vector representation to define
transformed data 310
                            │
                            ▼
Sorting the transformed data using a coarse sorting process to define coarse
sorted data 312
                            │
                            ▼
Sorting the coarse sorted data using a fine sorting process to define fine sorted
data, the fine sorted data defining a plurality of distances between data points of
the fine sorted data 314
```

Based on the fine sorted data, identifying an anomalous event from the plurality of events 316

Quarantining an artifact associated with an event from the plurality of events, based on a distance from the plurality of distances 318

Defining a plurality of scores based on the plurality of distances, each score from the plurality of scores associated with a representative event from the plurality of events 320

Receiving, from a plurality of sources, data associated with an event at the source, the data including an event timestamp and an event data-frame
402

↓

Defining a standardized event based on the event by parsing the data to map predefined data fields within the event data-frame based on predefined standardization rules
404

↓

Calculating a representative identifier for the event by providing a representation of the standardized event as an input to a predefined function
406

↓

Defining an identifier for the event based on the representative identifier
408

↓

Calculating a distance of the identifier to an identifier associated with each event cohort from a plurality of event cohorts 410

↓

Assigning the event to an event cohort from the plurality of event cohorts based on the distance meeting a criterion of that cohort
412

↓

Identifying a set of uncommon events based on a distance associated with a representative identifier of each event from the set of uncommon events not meeting a criterion of an event cohort from the plurality of event cohorts 414

↓

Identifying an anomalous event based on the distance exceeding a predetermined threshold 416

FIG. 4

METHODS AND SYSTEMS FOR IDENTIFYING ANOMALOUS COMPUTER EVENTS TO DETECT SECURITY INCIDENTS

CROSS-REFERENCE TO RELATED APPLICATIONS

This application claims priority to and the benefit of U.S. Provisional Patent Application No. 63/308,391, entitled "Methods and Systems for Identifying Commonality of Computer Events," filed Feb. 9, 2022, the disclosure of which is incorporated herein by reference in its entirety.

BACKGROUND

A computer and its associated hardware and software can produce a manifest of its activity in the form of events. In some known systems, these events are captured natively by the kernel or operating system and applications either natively or from third party software, (e.g. Endpoint Detection & Response software). In some known systems, this data is stored locally or centrally within an enterprise as log data (e.g., security events, audit events, event logs, etc.) that are generated by various systems and/or devices. Often these events may be transmitted to and stored in a cloud-based database or other central repository (e.g., security information and event management). In some known systems, the data can be retained for periods of time within an enterprise due to compliance and other security reasons. Organizations can make it a policy to store information for a predetermined length of time. Storage of this data can be costly and inherently difficult to leverage in the event of an incident due to the sheer volume of data. Event data is inherently sensitive and often not shared outside of an enterprise or organization. The vast majority of computer event data represents common repetitive events that are not typically referenced or later reviewed. Such data are nonetheless still recorded and saved indiscriminately.

Additionally, the types of circumstances that can arise to make an event anomalous can constantly change as computer systems and networks as well as threats and attacks on computer systems are constantly changing. Anticipating various circumstances that can lead to such anomalous events can be computationally difficult. Thus, there is a need for dynamically determining computer events that are atypical (e.g., anomalous, uncommon, different, etc.) to allow for the identification and storage of events that may indicate a potential security incident, without overwhelming computing resources and is capable of scaling to larger groups of data.

SUMMARY

In some embodiments, a method includes receiving, from a source from a plurality of sources, data associated with an event at the source. The data includes an event timestamp and an event data-frame. The method further includes defining a standardized event based on the event by parsing the data to map predefined data fields within the event data-frame based on predefined standardization rules, calculating a representative identifier for the event by providing a representation of the standardized event as an input to a predefined function, defining an identifier for the event based on the representative identifier, calculating a distance of the identifier to an identifier associated with each event cohort from a plurality of event cohorts, assigning the event to an event cohort from the plurality of event cohorts based on the distance meeting a criterion of that cohort, and identifying an anomalous event based on the distance exceeding a predetermined threshold.

In some embodiments, a method includes receiving, from a plurality of sources, data associated with a plurality of events at the plurality of sources, standardizing the data based on a set of predefined standardization rules to define standardized data, defining a vector representation of the standardized data, transforming, by a machine learning model, the vector representation to define transformed data, sorting the transformed data using a coarse sorting process to define coarse sorted data and sorting the coarse sorted data using a fine sorting process to define fine sorted data. The fine sorted data defines a plurality of distances between data points of the fine sorted data. The method further includes, based on the fine sorted data, identifying an anomalous event from the plurality of events.

In some embodiments, a non-transitory processor-readable medium stores code representing instructions to be executed by one or more processors. The instructions include code to cause the one or more processors to receive, from a plurality of sources, data associated with a plurality of events at the plurality of sources, standardize the data based on a set of predefined standardization rules to define standardized data, define a vector representation of the standardized data, transform, by a machine learning model, the vector representation to define transformed data, sort the transformed data using a coarse sorting process to define coarse sorted data and sort the coarse sorting data using a fine sorting process to define fine sorted data. The fine sorted data defines a plurality of distances between data points of the fine sorted data. The instructions further include code to cause the one or more processors to, based on a distance from the plurality of distances and associated with an event from the plurality of events exceeding a threshold, quarantine an artifact associated with the event from the plurality of events.

BRIEF DESCRIPTION OF THE DRAWINGS

FIG. 3 shows a flowchart of a method for processing computer events, according to an embodiment.

FIG. 4 shows a flowchart of a method for identifying an anomalous event, according to an embodiment.

DETAILED DESCRIPTION

In some implementations, a user (e.g., administrator, software end-user, manager, etc.) provides data and/or information associated with a set of computer events. In some implementations, a system collects data automatically from a variety of sources. In some implementations, the computer events are from a variety of systems and enterprises. The computer events can be standardized, and a vector representation can be defined of the standardized data. In some implementations, a locality sensitive (LSH) function is applied on the standardized data. The vector representation can then be transformed by a machine learning model. The transformed data can be sorted, first by a coarse sorting process, then by a fine sorting process, to define a set of distances between data points. The distances can be used to identify anomalous events and/or quarantine an artifact associated with the events. In some implementations, the distances can be utilized to define a set of scores for the events that can be utilized to review the events. In some implementations, the systems and methods described herein categorize events into cohorts based on the distance meeting a criterion of a cohort.

Some techniques described herein allow for a system to reduce the volume of logged data by identifying anomalous events out of a larger set of events. Identifying anomalous events further increases productivity and throughput since a user would review events identified as anomalous instead of a larger set of events. Some techniques described herein increase the fidelity of threat detection by using various methods to identify anomalous events in a variety of methods. Additionally, the system can reduce the time to repair an issue (e.g., threat, problem, etc.) by substantially immediately identifying issues once the data is processed and/or by automatically acting upon an identified anomalous event.

As used herein, an artifact can be or include, for example, any portable executable file(s), registry key(s), dataset(s), file path(s), Uniform Resource Locator (URL), device(s), device behavior, user behavior, network behavior, network identifier, and/or entity represented and/or associated with computer-related events and/or resources. For further examples, an artifact can include a function of software code, a webpage(s), a data file(s), a model file(s), a source file(s), a script(s), a process, a binary executable file(s), a table(s) in a database system, a development deliverable(s), an active content(s), a word-processing document(s), an e-mail message(s), a text message, a network address, a device or entity (e.g., a network-connected compute device and/or computer system, a server, a smartphone, a tablet a laptop, a multimedia. device. etc.), a network address (e.g., a Media Control (MAC) address, Internet Protocol UP) address, etc.) of a compute device, and/or the like.

Figure 1:
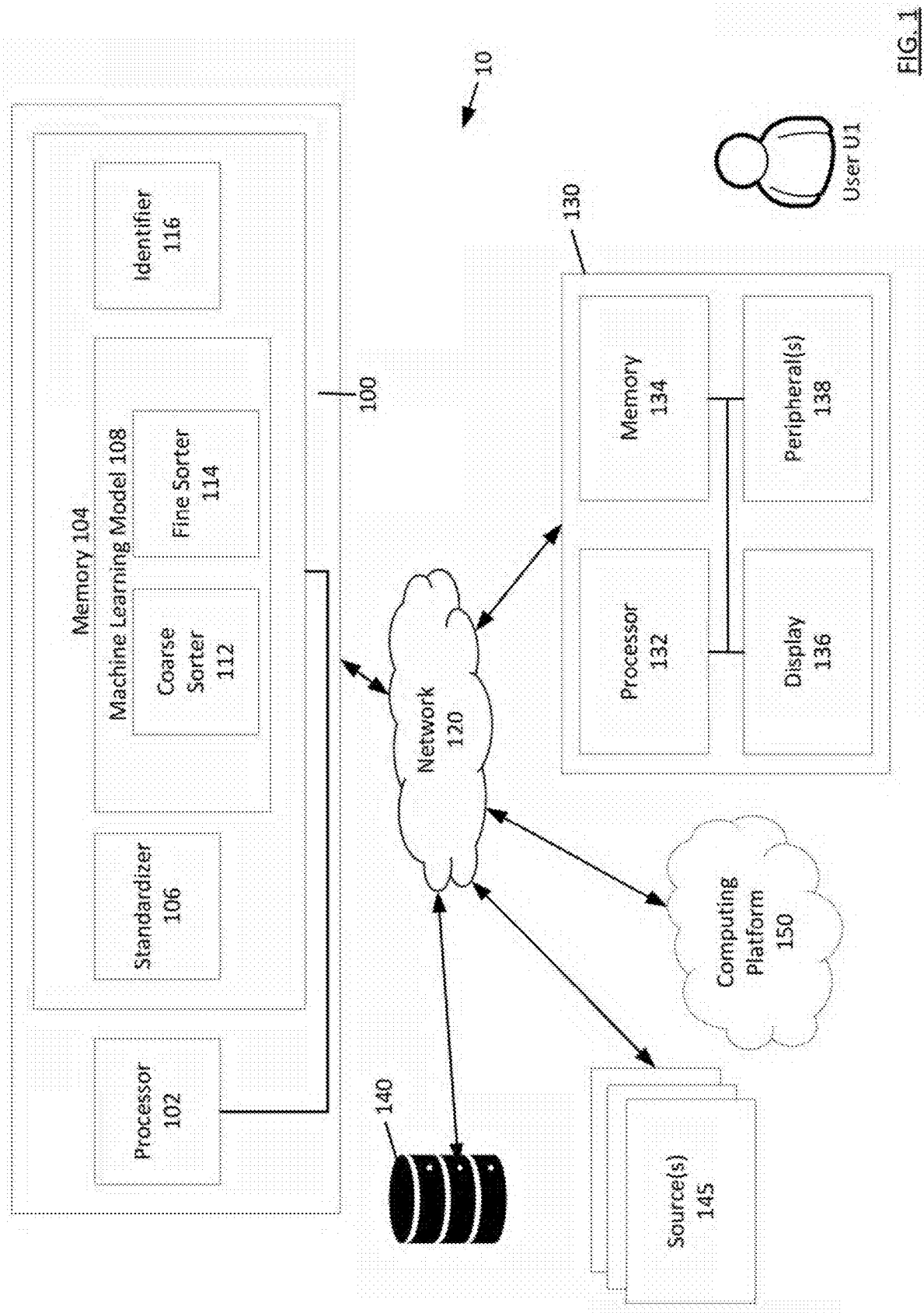
FIG. 1 shows a block diagram of a system for classifying and identifying computer events, according to an embodiment.

FIG. 1 shows a block diagram of a system 10 for classifying and identifying computer events, according to an embodiment. The system 10 is configured to manage and process data from various sources. In some implementations, the system 10 is configured to handle high fidelity event types, such as event types that report computer, user, device, and/or application activities and behaviors. The high-fidelity event types can originate from computer endpoints, applications, devices, and/or cloud instances. The system 10 can include a processing engine 100, a network 120, a user computer device 130, a database 140, source(s) 145, and a computing platform 150.

The network 120 may be used to facilitate communication between the components of the system 10. For example, the network 120 may facilitate operation between the processing engine 100, the user compute device 130, the database 140, the source(s) 145, and/or the event-driven platform 150. The network 120 can be any suitable communications network for transferring data, operating over public and/or private networks. For example, the network 120 can include a private network, a Virtual Private Network (VPN), a Multiprotocol Label Switching (MPLS) circuit, the Internet, an intranet, a local area network (LAN), a wide area network (WAN), a metropolitan area network (MAN), a worldwide interoperability for microwave access network (WiMAX®), an optical fiber (or fiber optic)-based network, a Bluetooth® network, a virtual network, and/or any combination thereof. In some instances, the network 120 can be a wireless network such as, for example, a Wi-Fi or wireless local area network ("WLAN"), a wireless wide area network ("WWAN"), and/or a cellular network. In other instances, the network 120 can be a wired network such as, for example, an Ethernet network, a digital subscription line ("DSL") network, a broadband network, and/or a fiber-optic network. In some instances, the network can use Application Programming Interfaces (APIs) and/or data interchange formats (e.g., Representational State Transfer (REST), JavaScript Object Notation (JSON), Extensible Markup Language (XML), Simple Object Access Protocol (SOAP), and/or Java Message Service (JMS)). The communications sent via the network 120 can be encrypted or unencrypted. In some instances, the communication network 120 can include multiple networks or subnetworks operatively coupled to one another by, for example, network bridges, routers, switches, gateways and/or the like (not shown).

The user compute device 130 can be a device configured to control and/or provide signals to the system 10. For example, the user compute device 130 may be used to provide event processing instructions to the processing engine 10. In some implementations, the user compute device 130 may be configured to monitor the operation of the system 10. For example, the user compute device 130 may display progress and/or results of event processing. The user compute device 130 can include a processor 132, memory 134, display 136, and peripheral(s) 138, each operatively coupled to one another (e.g., via a system bus). In some implementations, the user compute device 130 is associated with (e.g., owned by, accessible by, operated by, etc.) a user U1. The user U1 can be any type of user, such as, for example, an administrator, a manager, and/or the like.

The processor 132 of the user compute device 130 can be, for example, a hardware based integrated circuit (IC), or any other suitable processing device configured to run and/or execute a set of instructions or code. For example, the processor 132 can be a general-purpose processor, a central processing unit (CPU), an accelerated processing unit (APU), an application specific integrated circuit (ASIC), a field programmable gate array (FPGA), a programmable logic array (PLA), a complex programmable logic device (CPLD), a programmable logic controller (PLC) and/or the like. The processor 132 can be operatively coupled to the memory 134 through a system bus (for example, address bus, data bus and/or control bus).

The memory 134 of the user compute device 130 can be, for example, a random-access memory (RAM), a memory buffer, a hard drive, a read-only memory (ROM), an erasable programmable read-only memory (EPROM), and/or the like. In some instances, the memory 134 can store, for example, one or more software programs and/or code that can include instructions to cause the processor 132 to perform one or more processes, functions, and/or the like. In some implementations, the memory 134 can include extendable storage units that can be added and used incrementally. In some implementations, the memory 134 can be a portable memory (e.g., a flash drive, a portable hard disk, and/or the like) that can be operatively coupled to the processor 132. In some instances, the memory 134 can be remotely operatively coupled with a compute device (not shown). For example, a remote database device can serve as a memory and be operatively coupled to the compute device.

The peripheral(s) 138 can include any type of peripheral, such as an input device, an output device, a mouse, keyboard, microphone, touch screen, speaker, scanner, headset, printer, camera, and/or the like. In some instances, the user U1 can use the peripheral(s) 138 to input a command to implement a policy bundle. For example, the user U1 may type the command using a keyboard included in peripheral(s) 138 to indicate the command and/or select the command using a mouse included in peripherals(s) 138 to indicate the command.

The display 136 can be any type of display, such as, for example, a Cathode Ray tube (CRT) display, a Liquid Crystal Display (LCD), a Liquid Emitting Diode (LED) display, an Organic Light Emitting Diode (OLED) display, and/or the like. The display 136 can be used for visually displaying information (e.g., command line, etc.) to user U1. For example, display 136 can display process or the results of a policy bundle implementation.

The database 140 may be used to store data and/or information regarding events from the sources 145 and/or from the user U1 via the user compute device 130. In some implementations, each event includes an associated timestamp and/or data-frame that represents the event. In some implementations, the data can include data fields that is associated with metadata (e.g., usernames, host names, IP addresses, MAC addresses, process descriptions, timestamps, etc.).

The database 140 can be any device or service (e.g., hard-drive, server, cloud storage service, etc.) configured to store signals, information, commands, natural language (NL) descriptions, and/or data. The database 140 may receive and store signals, information and/or data from the other components of the system 10. The database 140 may include a local storage system associated with the policy processing system 10, such as a server, a hard-drive, and/or the like, or a cloud-based storage system. In some implementations, the database 140 may include a combination of local storage systems and cloud-based storage systems.

Additionally, the database 140 can store data and/or information in a distributed cloud, online analytical processing (OLAP) database, and/or similar relational database with ledger entry. In some implementations, the data can be collected and stored in the database 140 by a recording service (e.g., Windows Event Log, SysInternals Sysmon, Endpoint Detection & Response (EDR), etc.). In some implementations, the individual events, portions of events, or groups of events are assigned a unique ID (UID) that serves as an identifier. The UID can include an enterprise/client ID, geographic ID, IP, Operating System, User, and/or other information that can be used as an identifier. The database 140 can receive data from various source types including system data pipe streams, datalakes, data warehouses, other databases, or raw formats. In some implementations, the database 140 receives data and/or information via the network 120. In some implementations, the data can be supplied to the database 140 via a publisher/subscriber protocol. In some implementations, outputs from the processing engine 100 are stored in the database 140 for later access.

In some implementations, the database 140 includes and/or operates as a ledger. For example, the database 140 can include a relational database with ledger entries for every event that is performed and/or occurs. In some implementations, ledger entries can include any of a standardized date and/or time of event origin, a UID for the event translated to a one-way hash (e.g., SHA3, SHA256, etc.), a UID for an individual data-frame(s) calculated using a one-way hash, a data origin owner entity and applicable region and industry or group, an incremental count of duplicate occurrences for the individual data-frames, a mapping and incremental count for associated event metadata (e.g., usernames, hostnames, MAC address, process description, etc.), labels for preprocessing and/or post processing rules, assigned cohort labels, aggregate event value score, event topic labels, aggregate event value score, event topic labels, similarity hex-hash, cohort evaluation scores (e.g., aggregate and/or individual), token order, refactoring variance, model version and/or configurations used on input, revised input integer for random projection matrix, various metrics and statistical calculations, revision history, and/or other information associated with the event.

In some implementations, ledger entries can be aggregated to include a single serialized value for each row, which can contain measurable data fields, comparable data fields, and/or data field association mappings. Data field mappings can be identified through association rule mining techniques on a ledger. Data field mappings can be used for improving data mapping lookups and to form the basis of a Graph Database used by a Graph Neural Network (GNN).

The source(s) 145 can provide data and/or information regarding various computer events. The source(s) 145 can be associated with various entities (e.g., company, organization, etc.) and/or users. In some implementations, the source(s) 145 can be systems, compute devices, databases, or the like. In some implementations, the source(s) 145 each store data and/or information in different formats (e.g., storage protocols, storage locations, storage types, file formats, etc.). A subset of the source(s) 145 can be linked (e.g., internally and/or via the network 120) or each of the source(s) 145 can be independent of the others. In some implementations, the source(s) 145 send data associated with events to the database 140 periodically or sporadically. In some implementations, the source(s) 145 send data associated with events to the database 140 based upon a requesting signal.

The computing platform 150 is a computing model that can manage certain processes of the system 10. For example, the computing platform 150 can receive data associated with events from the source(s) 145 and prepare the data for the user U1 so that the user U1 can select certain aspects of the data for processing. In some implementations, the computing platform 150 can integrally formed with the processing engine 100. In some implementations, the computing platform 150 can complete certain functions of the processing engine 100. The computing platform 150 can include an external server, a cloud computing platform, a serverless computing model, and/or the like.

The processing engine 100 is configured to receive data associated with a set of events and process the data to determine if any of the events of the set of events are anomalous and if so, determine which events are anomalous. The processing engine 100 can include a processor 102 and a memory 104, each operatively coupled to one another (e.g., via a system bus). The memory 104 can include a standardizer 106, a machine learning model 108, a coarse sorter 112, a fine sorter 114, and an identifier 116. In FIG. 1, the coarse sorter 112 and the fine sorter 114 are shown to be included in the machine learning model 108, but, in some embodiments, at least one of the coarse sorter 112 and the fine sorter 114 can be separate from the machine learning model 108. In some implementations, the user compute device 130 is associated with (e.g., owned by, accessible by, operated by, etc.) an organization, and the processing engine 100 is associated with (e.g., owned by, accessible by, operated by, etc.) the same organization. In some implementations, the user compute device 130 is associated with (e.g., owned by, accessible by, operated by, etc.) a first organization, and the processing engine 100 is associated with (e.g., owned by, accessible by, operated by, etc.) a second organization different than the first organization. In some implementations, the processing engine 100 and the user compute device 130 may be components of the same computing system.

The processor 102 of the processing engine 100 can be, for example, a hardware based integrated circuit (IC), or any other suitable processing device configured to run and/or execute a set of instructions or code. For example, the processor 102 can be a general-purpose processor, a central processing unit (CPU), an accelerated processing unit (APU), an application specific integrated circuit (ASIC), a field programmable gate array (FPGA), a programmable logic array (PLA), a complex programmable logic device (CPLD), a programmable logic controller (PLC) and/or the like. The processor can be operatively coupled to the memory 104 through a system bus (e.g., address bus, data bus, and/or control bus).

The memory 104 of the of the processing engine 100 can be, for example, a random-access memory (RAM), a memory buffer, a hard drive, a read-only memory (ROM), an erasable programmable read-only memory (EPROM), and/or the like. In some instances, the memory 104 can store, for example, one or more software programs and/or code that can include instructions to cause the processor 102 to perform one or more processes, functions, and/or the like. In some implementations, the memory 104 can include extendable storage units that can be added and used incrementally. In some implementations, the memory 104 can be a portable memory (e.g., a flash drive, a portable hard disk, and/or the like) that can be operatively coupled to the processor 102. The processor 102 can be configured to execute instructions stored in the memory. The processor 102 can execute the standardizer 106, the machine learning model 108, the coarse sorter 112, the fine sorter 114, and the identifier 116. In some instances, the memory 104 can be remotely operatively coupled with a compute device (not shown). For example, a remote database device can serve as a memory and be operatively coupled to the compute device.

The processing engine 100 can receive instructions and/or data from the user U1. For example, the user U1 can input a set of events (e.g., from the database 140) including data and data-frames associated with the set of events, preview data associated with the set of events, and select data fields for processing via the network 120. For example, the user U1 can input a set of events associated with an organization, the set of events including associated data. The user U1 can then preview the types of data fields associated with the data and can choose a subset of the data fields for processing by the processing engine 100. In some embodiments, the processing engine 100 can receive the set of events from the source(s) 145. For example, the processing engine 100 can automatically pull and/or receive events from the source(s) 145. In some embodiments, the source(s) 145 can send new events and/or sets of events to the processing engine 100. In some implementations, the processing engine 100 receives selections on which data fields to process. In some implementations, the processing engine 100 can automatically determine or identify which data fields to process.

The standardizer 106 is configured to receive the data associated with the set of events and standardize the data for further processing. In some implementations, the standardizer 106 can process the data into a universal format. Standardization can facilitate universal recognition of values within the event data. Universal recognition of values can be used for assigning weighted values and for separating non-relevant data from relevant data. For example, event data can include a timestamp with multiple delineated and non-delineated fields, some of which can include data that is not pertinent to a present process. The data that can be identified and standardized can be any type of data that appears in all or a subset of events. For example, data that can be identified and standardized can include file type, date format and syntax, time format and syntax, file location, file origin, etc. The standardizer 106 parses, standardizes, and separates valuable data fields from non-valuable fields. Additionally, the standardizer 106 can identify, parse, and process metadata include artifact categories from multiple operating systems, such as file/process paths, extensions, process, registry, command line arguments, Internet Protocol (IP) address, Domain Name System (DNS) query, etc. Additionally, the standardizer 106 can recognize additional metadata associated actions associated with the event such as a thread, driver loaded, file created, file creation time, file delete, file delete logged, file stream created, image loaded, named pipe connected, named pipe created, network connection detected, clipboard, process accessed, process create, etc.

In some implementations, the standardizer 106 can pre-process data including cleaning, de-duplicating, filtering based on time, filtering based on origin, and/or the like. In some implementations, the data that is received by the standardizer 106 is already pre-processed. For example, the database 140 can pre-process data that is received by the database 140. The standardizer 106 is configured to standardize the information stored in data fields of the data and standardize the information and implement them in standardized data fields. The standardized data includes data fields that are measurable and comparable. In some implementations, the standardizer 106 generates unique hashes for the events and data-frames. In some implementations, the standardizer 106 can store the unique hashes in a ledger (e.g., such as in the database 140) and any duplicates can be noted and/or removed. The standardized data can be used to define a mapping. In some implementations, the mapping can be identified through associated rule mining techniques. In some implementations, the mapping can be used to form the basis of a Graph Neural Network (GNN).

The machine learning model 108 is configured to process the standardized data received from the standardizer 106. The machine learning model 108 can include the coarse sorter 112 and the fine sorter 114. In some embodiments, at least one of the coarse sorter 112 and the fine sorter 114 are separate from the machine learning model. The machine learning model 108 can accept a selection from a user or can automatically identify which data fields of the standardized data are to be processed. The machine learning model 108 identifies similarities between computer events and can expose patterns that can be used to add context to groups of computer data and/or to individual computer events. Based on the results from the machine learning model 108, predictions can be made on what events are normal and/or anomalous.

The machine learning model 108 can calculate representative identifiers for the events by providing a representation of the standardized event as an input to a predefined function (e.g., hash function, vector function, tokenization function, feature function, etc.). In some implementations, the coarse sorter 112 includes a predefined function that includes tokenization processes. The data fields can be paired with a corresponding tokenization processes by a pre-trained transformer model, a neural network (NN), or by a manually applied configuration script. In some implementations, the tokenization processes include a WordPiece tokenization algorithm.

Once the standardized data is tokenized to define tokenized data, the output tokenization can then be further processed by a word embedding process of the coarse sorter 112. The word embedding process can include, for example, GloVe (Global Vectors for Word Representation), FastText, ELMO (Embeddings from Language Models), BERT (Bidirectional Encoder Representations from Transformers), ULMFiT (Universal Language Model Fine-tuning), Word2Vec, Universal Sentence Encoder, RoBERTa, XLNet, ALBERT and T5. In some implementations, the word embedding process can be chosen (e.g., manually, or automatically) based on the data fields selected and/or identified. The word embedding process can create and/or define a fixed length vector representation.

In some implementations, creating fixed length vector representations can be further refined with additional methods including applying sentence embedding techniques. The fine sorter 114 can include the sentence embedding techniques and/or other techniques used to further process vector representations. The sentence embedding techniques can include, for example, locality sensitive hashing (LSH), MinHash, SimHash, or other techniques capable of hashing data. In some implementations, multiple types of word embedding processes and/or sentence embedding processes can be used. The machine learning model 108 can then group/cluster the processed data into cohorts. In some embodiments, the fine sorter 114 can group/cluster the processed data into cohorts. Unique cohort labels can be assigned to the processed data by applying a random projection technique to the vector representations and/or a hash, resulting in the processed data being grouped by similarity. In some implementations, the similarity is a measurable output in the form of a similarity hex-hash. In some implementations, the originating event data-frame content can be discarded once the hex-hash is formed since the translation of the data-frame has been made into the hex-hash and the original corresponding unique IDs have been recorded and can be paired later on with the source raw event. Discarding the originating data-frame content can mitigate storage costs and achieve privacy preservation similarity comparisons.

In some implementations, the machine learning model 108 is capable of re-assigning cohorts by sorting similarity hashes based on a random projection. In some implementations, re-assigning cohorts can include an elbow method, classification accuracy, rand index, Fowlkes-Mallows index, adjusted mutual information, normalized mutual information, silhouette score, Davies-Bouldin index, Calinski-Harabasz index, etc. In some implementations, topic labels including short human-readable summaries, are assigned to describe the context of the cohort and the individual events within the cohort. Topic labeling can include named entity recognition, latent semantic indexing, latent Dirichlet allocation (DLA), etc.

In some implementations, the machine learning model 108 computes a fingerprint hash of the event and/or a subset of the event, such as the selected data field. The fingerprint hash allows for anonymizing sensitive information by encoding/encrypting the data while still allowing for comparative functions to take place later on, reducing the storage of the originating data to a compressed and smaller data size, and optimizing and/or improving comparative operations for speed and scalability.

The machine learning model 108 can compute fingerprint hashes that are private and have metrics (e.g., similarity, clusters, etc.) that are not revealing of the underlying event data. The machine learning model 108 can include fingerprinting comparative algorithms and clustering techniques such as, for example, ball tree, closest pair of points problem, cluster analysis, content-based image retrieval, curse of dimensionality, digital signal processing, dimension reduction, fixed-radius near neighbors, Fourier analysis, instance-based learning, k-nearest neighbor algorithm, Linear least squares, LSH, MinHash, multidimensional analysis, nearest-neighbor interpolation, neighbor joining, principal component analysis, range search, similarity learning, singular value decomposition, sparse distributed memory, statistical distance, time series, Voronoi diagram, Wavelet, Lempel-Ziv Jaccard distance, bloom filter, SimHash, w-shingling, count-min sketch, concept mining, N-gram, k-mer, rolling hash, rabin fingerprint, vector space model, bag-of-words model, deep pairwise-supervised hashing, Facebook AI similarity search (Faiss), Winnowing and RareChunk, symmetrical covariance matrix, etc.

In some implementations, the machine learning process 108 can include a simplified fingerprinting process using a SimHash function calculated on the selected data-fields. By pre-parsing out the selected data-fields, the SimHash fingerprint uses fewer computing resources. Results of hashing functions can be stored in hash tables grouped by metadata. In some implementations, a distance corresponding to similarity of each subevent to others is calculated and recorded. The distance is a metric for comparing two binary data strings. While comparing two binary strings of equal length, the distance is the number of bit positions in which the two bits are different. In some implementations, one or many clustering techniques such as K-means or agglomerative clustering techniques are used to cluster by the distance set to a prescribed outer and inner limit. In some implementations, clustering can be randomly chosen by any initiating hash pair with distances calculated resulting in formed cohorts. In some implementations, as the size of the fingerprint database grows, the scalability and the clustering processing become limiting factors. A distribution process can be applied to aid in scalability. Additionally, a pseudo-random hash function or other cryptographic based hash can be applied to further prevent theoretical reversal and reveal of the fingerprinted data.

The machine learning model 108 can additionally further incorporate auxiliary enrichment of the cohorts and events and the resulting implied event value scores. Using the same method and process applied to the data-frames at the time of ingestion, a manually supplied event can be input as a hash-rule/search criteria and tagged with a human readable label (e.g., "malicious," "benign," etc.). The input can be updated to the ledger or can be used as a search to return the cohorts and the corresponding events.

Additional enrichments can be received from various sources (e.g., Threat Intelligence Feeds for indicators of compromise). The additional enrichments can be applied without writing a pattern matching rule logic. The rule can be a sub-label for a cohort and any responsive criteria is automatically clustered to and/or assigned an associated label name.

In some embodiments, assignments to cohorts can be manually overridden. Manual overriding is useful in scenarios where a cohort does not contain accurate groupings of events and a manual correction is helpful. In some embodiments, the data-frame hex-hash can be compared to a random sampling within the cohort lists and the cosine similarities can be calculated. The data-frame is then assigned to the next closest cohort that also shares similar topic labeling. In some implementations, an additional error checking process can be trained on manual submission for future re-enforcement model training.

In some embodiments, an internal process for self-correction of faulty cohort assignments can involve statistical sampling of events and applying a submission process with precision techniques. For example, the ledger is checked for the blended evaluation results and any manual weight assignments. Events that are in the lower scored threshold are then flagged for re-assignment. In some implantations, the correction process can include refactoring the data-frames so that the tokenized data is randomly re-ordered and refactored, updating the ledger so that the order of the tokenized data or refactoring is recorded, applying the new array of tokenized data into the non-transformer word embedding model, then sentence embeddings, and random projection, re-applying the evaluation criteria, and/or the like. If the evaluation results move to an acceptable level, the new cohort can be recorded with the hex-hash values. In some implementations, the acceptable level can be based on an individual score and/or an aggregate score being above a predetermined threshold or can be based on a manual review of the result. If the evaluation results are not in the acceptable range, then the data-frame can be re-processed using the pre-trained transformer model for token assignment. In some implementations, if the results do not meet an acceptable evaluation range, random projection matrix values can be adjusted to be proportionally higher if the cohort is sparse and proportionally lower if the cohort is dense. If the results still do not meet an acceptable evaluation range, then they are flagged for cohort re-assignment and re-distributed using topic labels similarity. In some implementations, if a large set of cohorts reach unacceptable evaluation scores, then the models are re-trained to account for the variances and adjustments made of the cohorts.

The identifier 116 is configured to receive processed data from the machine learning model 108 and review the processed data to determine if an event is anomalous. The identifier can provide iterative comparison of the computer events, components of the events, groups of events, and/or subevents. In some implementations, a relationship between the incorporation of time-series and UID metadata is applied. The output will produce a closeness metric (e.g., score) that can be used to determine how common (e.g., similar to other events) or prevalent an event is. In some embodiments, comparing events can be based on a period of time, distinction of the computer users, computer group or organizational ownership, industry or intended activity, functionality, geographical location, and/or other classifications.

The scores can be translated to a single normalized scale (e.g. 0-100). The scores can be a metric that can be used to determine how valuable events are for present and/or future scenarios. Value can be associated with common or uncommon events, which can either have or not have a use in current or future scenarios. An uncommon event is one that has no similar events and is not part of a cohort or has been disassociated with a cohort when paired with a meta-data item such as a user or host that contains the sole event. An event can be considered common if it is assigned to the highest density percentile cohorts, additionally if the event is paired to meta-data and it still maintains a high percentile of similar events, it is likely a common event. Metrics for determining common and uncommon data and/or events are updated as additional information is introduced. Such metrics may also be updated in batch form at set intervals or when variances in the data become too great computationally.

Scoring produces a database of fingerprints of computer events, sub-events, and individual artifacts/actions and an iterative comparison metric that is indicative of commonality of events. In some embodiments, the identifier 116 can identify outlier events that can be indicative of non-common events. In some embodiments, the fingerprint is secured from attempts to reveal the underlying event by the use of a pseudorandom or other cryptographic hash applied to the fingerprint.

The identifier 116 can also make use of a traditional query processing engine for pattern matching of data fields in the filtering pre-process stage. The identifier 116 can use multiple standard query or rule standards such as SQL, YAML, or YARA allowing for Boolean, Regex or other pattern matching to be achieved on the event data. Results from querying can be used for additional enrichment of an event or to provide supplemental weighting to the cohort assignment process. For example, if a known IOC (indicator of compromise) is identified by a rule, the known IOC can be tagged as such and properly identified as such within the cohort.

Additionally, the identifier 116 can allow for event relationships to be derived and viewed from the ledger. For example, relationships that can be derived and viewed from the ledger include the occurrence of identical or similar events across sensitive environments without divulging the event content, the occurrence of identical, or similar events broken up by any shared metadata field, a listing of the events grouped into cohorts that contain similar data in their event data-frame(s), the density of the cohort for a give event(s), the density calculated by the total events in the cohort, the count of exact events, similar events, and the corresponding proportional frequency to other cohort statistics in the population, a listing of events that are not similar to any other events (e.g., outliers), events that are least similar within a cohort, events that are least similar within a cohort and a shared metadata field, events that share similar topic labels, average time distance for the events within a cohort, and/or the like. In some implementations, relationships can be auto generated by the use of a graph machine learning technique (e.g., a GNN).

Figure 2:
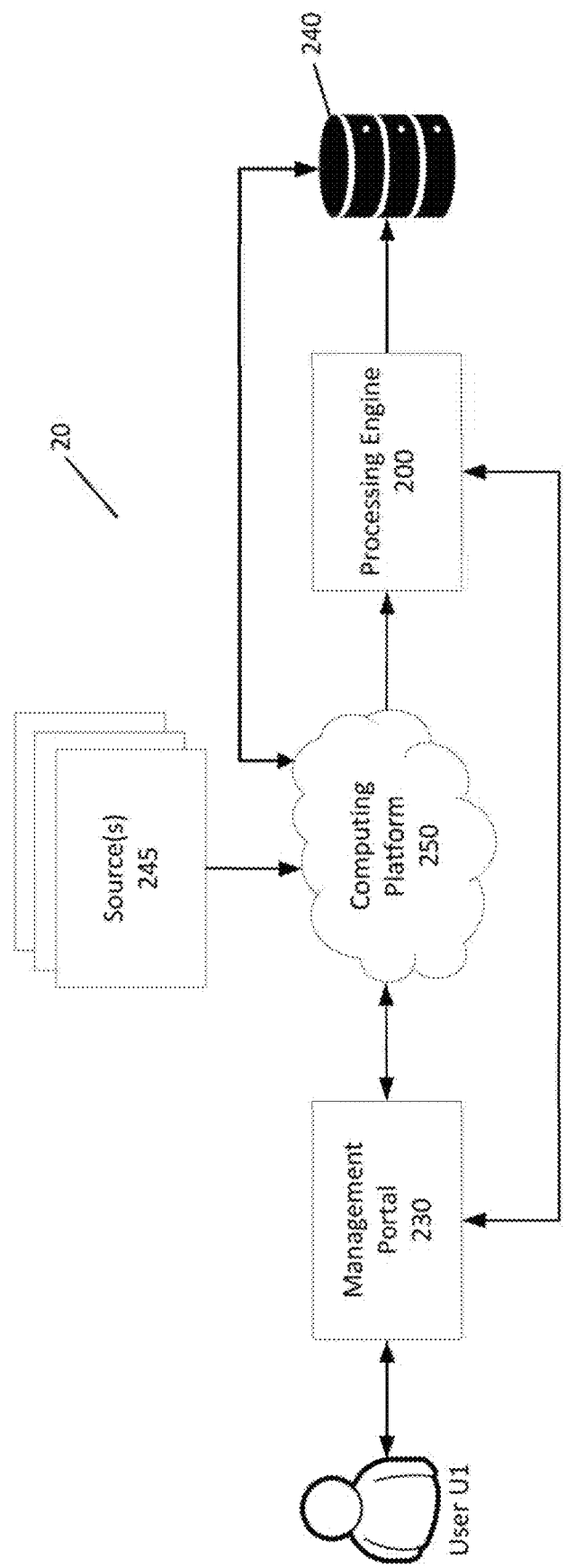
FIG. 2 shows a block diagram of a processing environment for processing computer events, according to an embodiment.

FIG. 2 shows a block diagram of a processing environment 20 for processing computer events, according to an embodiment. In some implementations, the processing environment 20 is structurally and/or functionally similar to the system 100 of FIG. 1. The processing environment 20 can be used to identify anomalous events. The processing environment 20 includes a management portal 230 (e.g., functionally and/or structurally similar to at least a portion of the user compute device 130 of FIG. 1), a computing platform 250 (e.g., functionally and/or structurally similar to the computing platform 150 of FIG. 1), source(s) 245 (e.g., functionally and/or structurally similar to the sources 145 of FIG. 1), a processing engine 200 (e.g., functionally and/or structurally similar to the processing engine 100 of FIG. 1), and a database 240 (e.g., functionally and/or structurally similar to the database 140 of FIG. 1). A user U1 can interact with the processing environment 20 via a management portal 230.

In some implementations, the processing environment 20 is a Software-as-a-Service (SaaS) environment. In a SaaS environment, a user can make an account on a web portal via the management portal 230 and can be presented with instructions on how to process event data. The results of the process can then be used by the user U1 to make data driven decisions, uncover insights that can be useful for a business, industry, and/or research purpose. In a SaaS environment, application programming interfaces (APIs) can be used to allow for access to data for analysis or review via the account and/or to retrieve events from a user's systems and/or databases.

The user U1 can be an administrator, manager, security professional, or other user of the processing environment 20. The user interacts with the management portal 230, which can be a user computer device configured to manage data processing in the processing environment 20. The user U1 can input computer event sets into the management portal 230 or can direct computer event data from the source(s) 245 and/or from the database 240. The management portal 230 can present information to the user U1 in a user-understandable format such as a no-code user-interface/user-experience. In some implementations, the management portal 230 presents the user U1 with a web-based connection tool to select and connect to the input data source(s) and also to define the credentials to be used. Data transformation options can also be presented to the user U1. The user U1 can preview the inputted data schemas and various transformation options (such as merging, renaming, removing, or converting data fields). The user U1 can also select one or more destination paths to which the data should be sent. The user U1 can make selections corresponding to a desired outcome. For example, the management portal 230 can accept the user U1's selections for which data-frames from the event sources should be enriched. Enrichment can include an assignment of a data-frame to a cohort score, an output of an engine, such as engine 100, and/or the like. In some implementations, a component of the processing environment 20 can automatically identify data-frames for enrichment based on a predetermined list of exact and similar column names.

In some implementations, the management portal 230 can be used to display a dashboard to the user U1. The dashboard can include information received from the processing engine 200 and/or other components of the processing environment 20. The dashboard can include information such as a system management page, insights into the data, cohorts, data mappings, data relationships, a searching feature, and/or a connection tool. In some embodiments, the processing environment 20 includes an API that can establish connections, enrich data, and/or process data and result searches. The API can be used to lookup each data-frame submitted to the computing platform 250. Resulting entries can be returned as event enrichment. Using an API can be useful if a publicly available event submission website is used or if implemented as a plugin to a vendor.

The computing platform 250 can receive input from the user U1 via management portal 230, database 240, and/or the sources 245. The computing platform 250 can include multiple data ingestion types such as a local upload, Elastic, Kafka, publisher/subscriber, etc. The computing platform 250 can generate a data and/or data field preview that can be sent back to the management portal 230 for review by the user U1. The computing platform 250 can also present data fields for processing to the management portal 230 so that the user U1 can make a selection. In some implementations, the computing platform 250 can perform data preparation steps. The data preparation steps can include, for example, data deduplication of the selected fields, standardizing fields, relabeling fields, filtering data, removing data, converting data, etc.

The processing engine 200 can receive the prepared data from the computing platform 250. The processing engine 200 processes the selected data fields including applying labels, clustering into cohorts, and/or other methods described in reference to the processing engine 100 of FIG. 1. The processing engine 200 can additionally generate scores for the computer events based on the processed data fields as well as map the computer events and record relationships between computer events. The processing engine 200 can additionally consume and/or generate analytics based on processing the computer events. The output of the processing engine 200 can be sent to the management portal 230 for review by the user and/or can be sent to the database 240 for storage and/or for future access.

FIG. 3 shows a flowchart of a method 300 for processing computer events, according to an embodiment. The method 300 can be executed by a system, such as the system 10 of FIG. 1. The method 300 includes receiving, from a plurality of sources, data associated with a plurality of events at the plurality of sources, at 302; standardizing the data based on a set of predefined standardization rules to define standardized data, at 304; defining a vector representation of the standardized data, at 306; optionally applying a locality sensitive hashing (LSH) function on the standardized data, at 308; transforming, by a machine learning model, the vector representation to define transformed data, at 310; sorting the transformed data using a coarse sorting process to define coarse sorted data, at 312; sorting the coarse sorted data using a fine sorting process to define fine sorted data, the fine sorted data defining a plurality of distances between data point of the fine sorted data, at 314; based on the fine sorted data, identifying an anomalous event from the plurality of events, at 316; quarantining an artifact associated with an event from the plurality of events, based on a distance from the plurality of distances, at 318; and optionally defining a plurality of scores based on the plurality of distances, each score from the plurality of scores associated with a representative event from the plurality of events, at 320.

At 302, the method 300 includes receiving, from a plurality of sources (e.g., functionally and/or structurally similar to the sources 145 of FIG. 1), data associated with a plurality of events at the plurality of sources. In some implementations, a processing engine (e.g., structurally and/or functionally similar to the processing engine 100 of FIG. 1) executes 302. The data can include a data-frame, metadata, and/or similar information. In some implementations, the data can be received from a database (e.g., structurally and/or functionally similar to the database 140 of FIG. 1) storing the data. In some implementations, the processing engine sends as pull request for the data from a database (e.g., functionally and/or structurally similar to the database 140 of FIG. 1). In some implementations, the processing engine receives the data via a network (e.g., structurally and/or functionally similar to the network 120 of FIG. 1) or directly, such as via a flash drive, CD, hard drive transfer, and/or the like.

At 304, the method 300 includes standardizing the data based on a set of predefined standardization rules to define standardized data. In some implementations, a standardizer (e.g., structurally and/or functionally similar to the standardizer 106 of FIG. 1) executes 304. Defining a standardized event can include parsing the data and standardizing the data fields in the data-frame to a common format. In some implementations, the common format can be predetermined or can be based off the inputted event data. Standardizing can be based on a set of predefined standardization rules which can be determined and/or inputted. In some implementation, only certain data fields, such as those that are predefined and/or determined as desired to be standardized, are standardized. In some implementations, the predefined data fields are then mapped on an event map. The event map includes mappings of various events of the plurality of events.

At 306, the method 300 includes defining a vector representation of the standardized data. In some implementations, a machine learning model (e.g., functionally and/or structurally similar to the machine learning model 108 of FIG. 1) executes 306. The vector representation can be a representation of the standardized data from 304 and is of a predetermined length. Defining a vector representation can include applying a word embedding process, such as word2vec or the like.

At 308, the method 300 optionally includes applying an LSH function on the standardized data. In some implementations, the machine learning model executes 308. 308 can be used when using transformers to reduce the size of the dataset being provided to the transformer. In some implementations, such as when a transformer is not used, 308 can be optional.

At 310, the method 300 includes transforming, by a machine learning model, the vector representation to define transformed data. The machine learning model can be a transformer, in some implementations. The transformer can allow for more parallelization than other machine learning models. In some implementations, the machine learning model includes a neural network, reinforcement learning, a Bayesian network, a random forest, a support vector machine and/or a decision tree. The transformed data is prepared for sorting and categorizing by a coarse sorter (e.g., structurally and/or functionally similar to the coarse sorter 112 of FIG. 1) and a fine sorter (e.g., structurally and/or functionally similar to the fine sorter 114 of FIG. 1).

At 312, the method 300 includes sorting the transformed data using a coarse sorting process to define coarse sorted data. In some implementations, the coarse sorter executes the coarse sorting process. The coarse sorted data can include clustered data. In some implementations, the coarse sorting processing includes using an LSH function. Using an LSH can enhance the clustering process. In some implementations, the coarse sorting process can include using a WordPiece tokenization algorithm.

At 314, the method 300 includes sorting the coarse sorted data using a fine sorting process to define fine sorted data, the fine sorted data defining a plurality of distance between data points of the fine sorted data. In some implementations, the fine sorter executes the 314. In some implementations, the fine sorting process can include using at least one of a cosine similarity, a hamming distance, a Euclidean distance, or a nearest neighbor search to define the plurality of distances. The plurality of distances corresponds to the measured differences between the data points of the fine sorted data.

At 316, the method 300 includes identifying an anomalous event from the plurality of events based on the fine sorted data. In some implementations, an identifier (e.g., structurally and/or functionally similar to the identifier 116 of FIG. 1) executes 316. In some implementations, identifying the anomalous event is based on at least one of the distance of the plurality of distances exceeding a predetermined threshold. The predetermined threshold can be associated with a predefined similarity level, where distances above the predetermined threshold are considered anomalous as they are not similar enough to the other events. In some implementations, the method 300 can include identifying a set of uncommon events based on the plurality of distances for each event from the set of uncommon events not meeting a criterion. In some implementations, the criterion is associated with an event cohort. For example, when events are clustered into cohorts based on similarity, those that are not sufficiently similar to the cohort (e.g., distance is below the predetermined threshold) are classified as anomalous. In some implementations, identifying the set of uncommon events is based on metadata as associated with each event from the set of uncommon events. For example, the metadata of the uncommon events can differ from the metadata of events not identified as uncommon. Specifically, if events have a timestamp in common, events with different time stamps can be identified as uncommon. In some embodiments, the method 300 can include additionally taking remedial action based on identifying anomalous events. The remedial action can include at least one of identifying the anomalous event as indicative of malware, quarantining a file associated with the anomalous event, or restricting access to a device associated with the anomalous event.

At 318, the method 300 includes quarantining an artifact associated with an event from the plurality of events based on a distance from the plurality of distances. The artifact can be associated with a portion or portions of the event (e.g., metadata, data-field entry, etc.) that may be dissimilar from other events, causing the event to be anomalous. Quarantining can include locking the artifact so that the artifact cannot be sent, received, opened, etc., thus protecting other events from potentially malicious data. In some implementations, an anomalous event can first be determined based on the distance exceeding a predetermined threshold, such as in 316. Once the anomalous event is identified, the specific artifact or artifacts that are responsible for the event to be identified as anomalous can be identified and then quarantined. Quarantined artifacts can be reviewed and analyzed to determine if they are a credible threat or a false positive.

At 320, the method 300 optionally includes defining a plurality of scores based on the plurality of distances. In some implementations, each score from the plurality of scores is associated with a respective event from the plurality of events. In some implementations, a score from the plurality of scores can be associated with a distance from the plurality of distances and between a first event and a second event, where both the first event and the second event are in the same cohort. In some implementations, a score from the plurality of scores can be associated with a distance between a first event and a second event, where the first event and the second event are in different cohorts. The scores can be reviewed, either manually by a user or automatically by the system, to determine if action should be taken. For example, if there are scores that indicate that anomalous events are present, a user or system can determine action to remedy any issues that can be associated with the anomalous events.

FIG. 4 shows a flowchart of a method 400 for identifying an anomalous event, according to an embodiment. The method 400 can be executed by a processing engine, such as the processing engine 100 of FIG. 1. The method 400 includes receiving, from a plurality of sources, data associated with an event at the source, the data including an event timestamp and an event data-frame, at 402; defining a standardized event based on the event by parsing the data to map predefined data fields within the event data-frame based on predefined standardization rules, at 404; calculating a representative identifier for the event by providing a representation of the standardized event as an input to a predefined function, at 406; defining an identifier for the event based on the representative identifier, at 408; calculating a distance of the identifier to an identifier associated with each event cohort from a plurality of event cohorts, at 410; assigning the event to an event cohort from the plurality of event cohorts based on the distance meeting a criterion of that cohort, at 412; optionally identifying a set of uncommon events based on a distance associated with a representative identifier of each event from the set of uncommon events not meeting a criterion of an event cohort form the plurality of event cohorts, at 414; and identifying an anomalous event based on the distance exceeding a predetermined threshold, at 416. The method 400 is in reference to a single event of a set of events, but, in some implementations, can be applied to a larger set of event data.

At 402, the method 400 includes receiving, from a plurality of sources (e.g., functionally and/or structurally similar to the source(s) 145 of FIG. 1), data associated with an event at the source, the data including an event timestamp and an event data-frame. The data-frame can include metadata associated with each event and/or other information associated with the event. In some implementations, the data is received by a processing engine (e.g., functionally and/or structurally similar to the processing engine 100 of FIG. 1). In some implementations, the processing engine sends as pull request for the data from a database (e.g., functionally and/or structurally similar to the database 140 of FIG. 1). In some implementations, the processing engine receives the data via a network (e.g., structurally and/or functionally similar to the network 120 of FIG. 1) or directly, such as via a flash drive, CD, hard drive transfer, and/or the like.

At 404, the method 400 includes defining a standardized event based on the event by parsing the data to map predefined data fields within the event data-frame based on predefined standardization rules. In some implementations, a standardizer (e.g., structurally and/or functionally similar to the standardizer 106 of FIG. 1) executes 404. Defining a standardized event can include parsing the data and standardizing the data fields in the data-frame to a common format. In some implementations, the common format can be predetermined or can be based off the inputted event data. Standardizing can be based on a set of predefined standardization rules, which can be automatically determined and/or inputted by a user. In some implementation, only certain data fields, such as those that are predefined and/or determined as desired to be standardized, are standardized. The predefined data fields are then mapped on an event map. The event map including mappings of various events of a set of events associated with the event.

At 406, the method 400 includes calculating a representative identifier for the event by providing a representation of the standardized event as an input to a predefined function. In some implementations, a machine learning model (e.g., structurally and/or functionally similar to the machine learning model 108 of FIG. 1) can execute 406. In some implementations, the predefined function includes at least one of a hash function, a vector function, and/or a feature function. In some implementations, calculating the representative identifier includes a tokenization process such as a WordPiece tokenizer. The tokenization process can include tokenizing the standardized event to produce a tokenized event. The tokenized event can then be provided to a word embedding model to define a vector representation of the event. The vector representation acts as a representation of the standardized event from 404 and is of a predetermined length. In some implementations, the representative identifier identifies what type of function the predefined function is. For example, the representative identifier can be a hash identifier that identifies the predefined function as a hash function.

At 408, the method 400 includes defining an identifier for the event based on the representative identifier. In some implementations, the machine learning model executes 408. In some implementations, defining the identifier is based on at least one of a recurrent neural network (RNN) or a transformer. The representative identifier can represent the event anonymously and/or in a format that uses fewer computational resources for further processing.

At 410, the method 400 includes calculating a distance of the identifier to an identifier associated with each event cohort from a plurality of event cohorts. In some implementations, the machine learning model executes 410. In some implementations, calculating the distance is based on at least one of a cosine similarity, a hamming distance, a nearest neighbor search, or a Euclidean distance. In some implementations, calculating the distance is based on LSH. The distance can be associated with the relative differences between the identifier, and thus the event, and the identifier associated with each event cohort, and thus the event cohort.

At 412, the method 400 includes assigning the event to an event cohort from the plurality of event cohorts based on the distance meeting a criterion of that cohort. In some implementations, the machine learning model and/or an identifier (e.g., structurally and/or functionally similar to the identifier 116 of FIG. 1) executes 412. In some implementations, the criterion is associated with the distance being below a predetermined threshold. The distance being below a predetermined threshold can indicate that there is a sufficient similarity between an event and an event cohort to assign the event to that cohort. In some implementations, if the distance is below the predetermined threshold for multiple event cohorts, the event can be assigned to the event cohort associated with the shortest distance. In some implementations, if the distance is below the predetermined threshold for multiple event cohorts, the event can be assigned to multiple event cohorts (or the closest event cohort from the multiple event cohorts). In some implementations, such as when the distance does not meet a criterion of any cohort, the event can be left unassigned.

At 414, the method 400 optionally includes identifying a set of uncommon events based on a distance associated with a representative identifier of each event from the set of uncommon events not meeting a criterion of an event cohort from the plurality of event cohorts. In some implementations, the identifier executes 414. The criterion can correspond to a distance threshold. For example, uncommon events can be the events whose distance exceed a predetermined distance threshold, indicating that an anomalous difference may be present. In some implementations, identifying the set of uncommon events is based on metadata associated with each event of the set of uncommon events. For example, identifying can be based on the file type not being consistent with the filetype of other events. In some implementations, even if an event is assigned to a cohort, the metadata can lead to an event being determined as uncommon. For example, certain artifacts of metadata can be identified as anomalous in conjunction with certain cohorts. For example, certain file origins, such as those from known malicious actors, can be flagged as anomalous when they appear in certain cohorts. This additional review allows for known issues to be highlighted and tagged for further review.

At 416, the method 400 includes identifying an anomalous event based on the distance exceeding a predetermined threshold. In some implementations, the identifier executes 416. Anomalous events can correspond to those that do not belong to any cohort. For example, an event can be identified as anomalous if the distance calculated in 410 does not meet the criterion of an event cohort. In some implementations, an anomalous event can be identified if the distance between the identifier of the event and the identifier of each event within the cohort is above the predetermined threshold. For example, the event can be assigned to a cohort, but the event can then be identified as anomalous if the event is determined to be too dissimilar to the other events within the cohort (e.g., based on metadata). Once 416 is completed, the method 400 can repeat for other events, or multiple instance of the method 400 can be operating in parallel.

Figure 5:
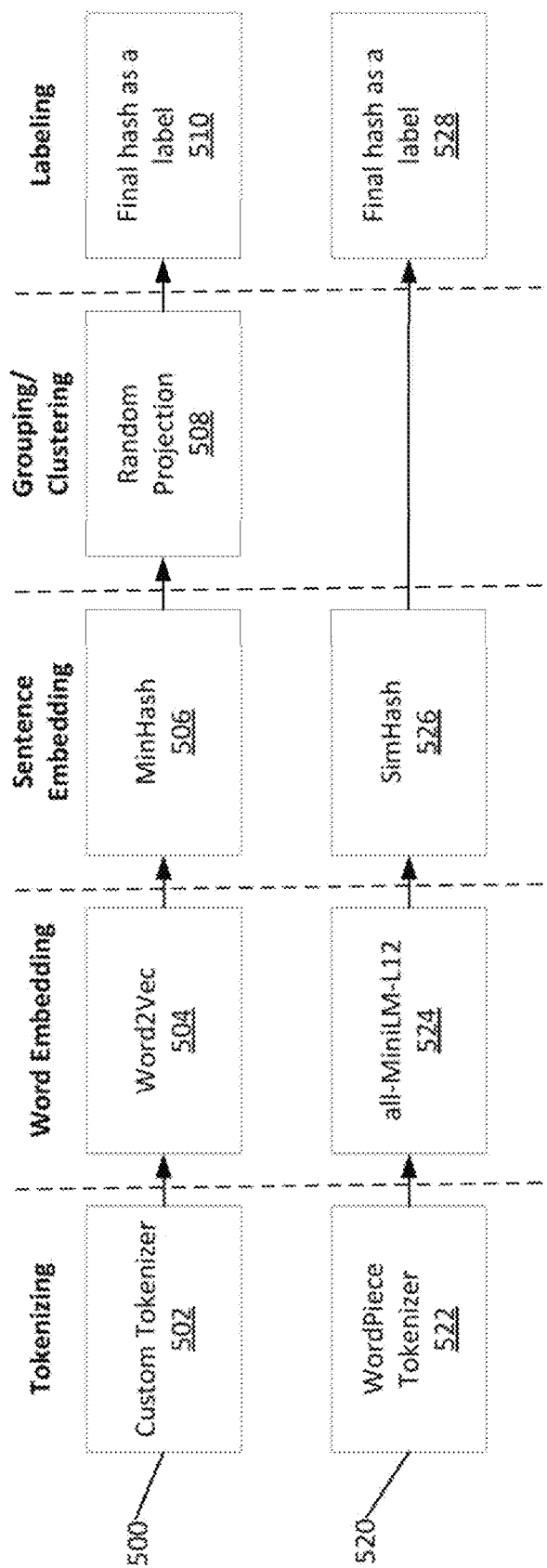
FIG. 5 shows a flowchart of methods for event processing, according to an embodiment.

FIG. 5 shows a flowchart of methods (500, 520) for processing data, according to an embodiment. The methods (500, 520) can be executed by a system, such as system 10, or by a component of the system 10, such as the machine learning model 108. The methods (500, 520) can receive standardized data and process the standardized data to categorize and sort the standardized data into cohorts.

The first method 500 includes tokenizing using a custom tokenizer, at 502, word embedding using Word2Vec, at 504, sentence embedding using MinHash, at 506, grouping/clustering using random projection, at 508, and labeling by using a final hash as a label, at 510. At 502, a custom tokenizer receives the standardized data and tokenizes the data. The custom tokenizer can be a tokenizer that is trained using manually inputted tokenization data. The custom tokenizer can be trained using historical data and/or simulated data. In some implementations, the custom tokenizer can include a combination of other tokenizers as desired by the system.

At 504, the tokenized data is processed by a word2vec technique, which uses a neural network for word embedding to generate vector representations of the data. Word2vec weighs the tokenized data statically based on surrounding strings. At 506, the vector is processed by a MinHash technique (e.g., min-wise independent permutations locality sensitive hashing scheme) to determine similarity within the vector. The similarity can be associated with how similar selected data fields of events are, or how similar the events are as a whole. The similarity data can then be used, at 508, to group/cluster using a random projection technique. Random projection allows for the events to be categorized into cohorts while reducing dimensionality and simplifying the data. Random projection can be used because random projection preserves distances between events. At 510, the events arranged into cohorts are hashed to label the events and/or the cohorts.

The second method 520 includes tokenizing using a WordPiece Tokenizer, at 520, word embedding using all-MiniLM-L12, at 524, sentence embedding using SimHash, at 526, and labeling by using a final hash as a label, at 528.

At 522, the standardized data is tokenized by a WordPiece tokenizer. In some implementations, another subword based tokenization method can be used. At 524, all-MiniLM-L12, a transformer, is used as a word embedding process. all-MiniLM-L12 maps the tokenized data from 522 to a vector space. The transformer allows for weights of tokens to be dynamically adjusted using an additional layer that captures the weight of the tokens in relation to surrounding tokens for a present sequence and for further sequences, thus allowing for unseen tokens to be predicted. The results of the transformer can be used for clustering processes. At 526, a SimHash technique is applied to the transformed data to determine similarity between events. SimHash allows for similarity determinations to be processed quickly. At 528, the events arranged into cohorts are hashed to label the events and/or the cohorts.

Figure 6:
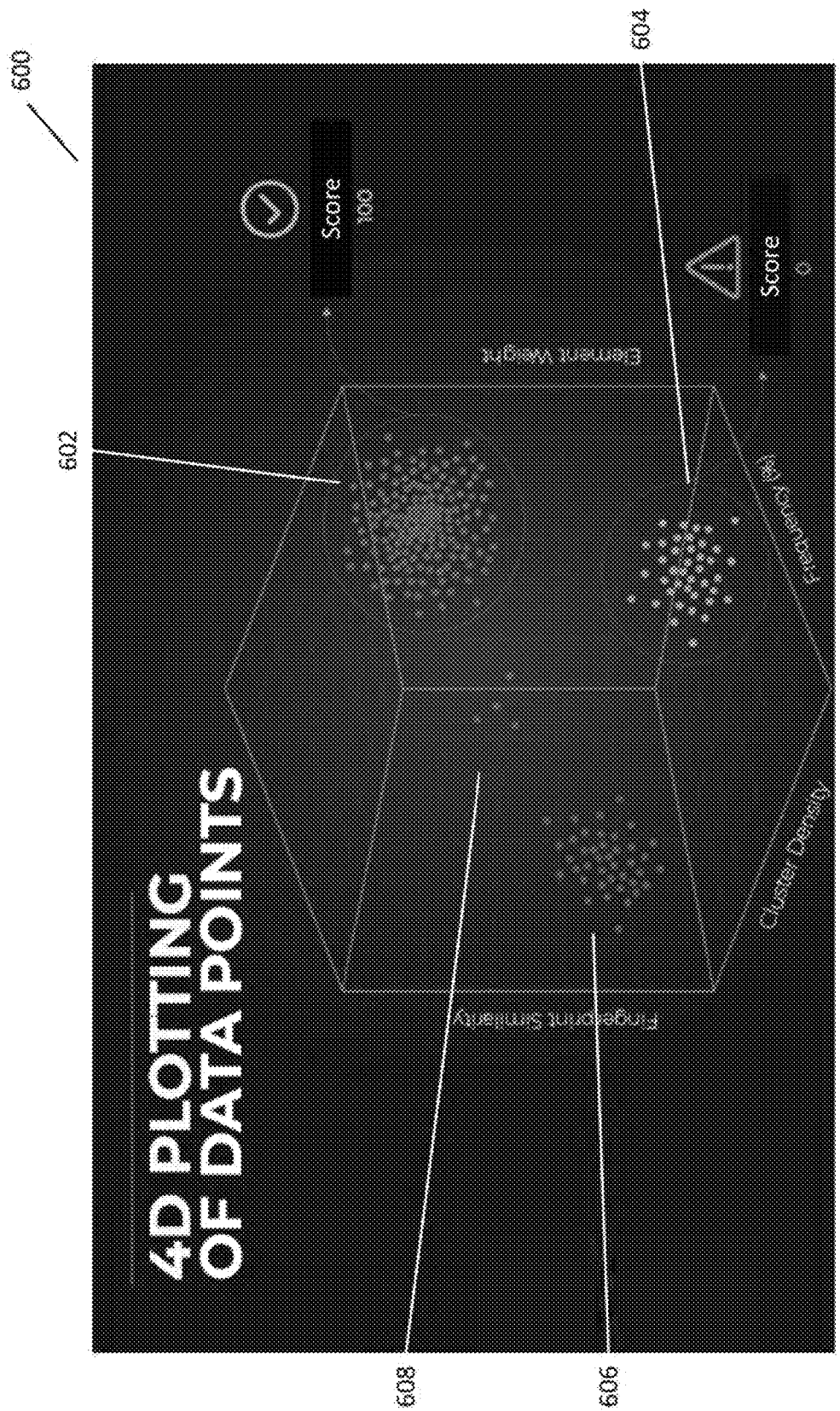
FIG. 6 shows a data point distribution, according to an embodiment.

FIG. 6 shows a data point distribution 600, according to an embodiment. The data point distribution 600 can be a visualization of the output of a system, such as system 10 of FIG. 1. For example, a processing engine (e.g., functionally and/or structurally similar to the processing engine 100 of FIG. 1) can process set(s) of computer events and organize the computer events into cohorts. A score can then be determined for the cohorts and/or the computer events within the cohorts. The data point distribution 600 can be, for example, the output of the method 300 of FIG. 3. The data point distribution 600 includes a first cohort 602, a second cohort 604, a third cohort 606, and a fourth cohort 608. Each of the cohorts (602, 604, 606, 608) are groups of events have been identified as having enough similarity to be assigned to the same cohort. The events in the data point distribution 600 are mapped based on cluster density, frequency, element weight, and/or fingerprint similarity. Each of the cohorts (602, 604, 606, 608) is assigned a score. The score of certain cohorts of the cohorts (602, 604, 606, 608) can indicate malicious events, while other cohorts can indicate that no malicious events are identified. The score can correspond to an internal score, where the score corresponds to an average score for the events within the cohort or can correspond to a score for the cohort in relation to the other cohorts. The first cohort 602 has a higher score than the second cohort 604, which can indicate that the cohort 602 has higher similarity of events (e.g., no outliers). In some implementations, scores below a predetermined threshold can result in a warning being generated for that cohort, as seen in the second cohort 604.

Figure 7:
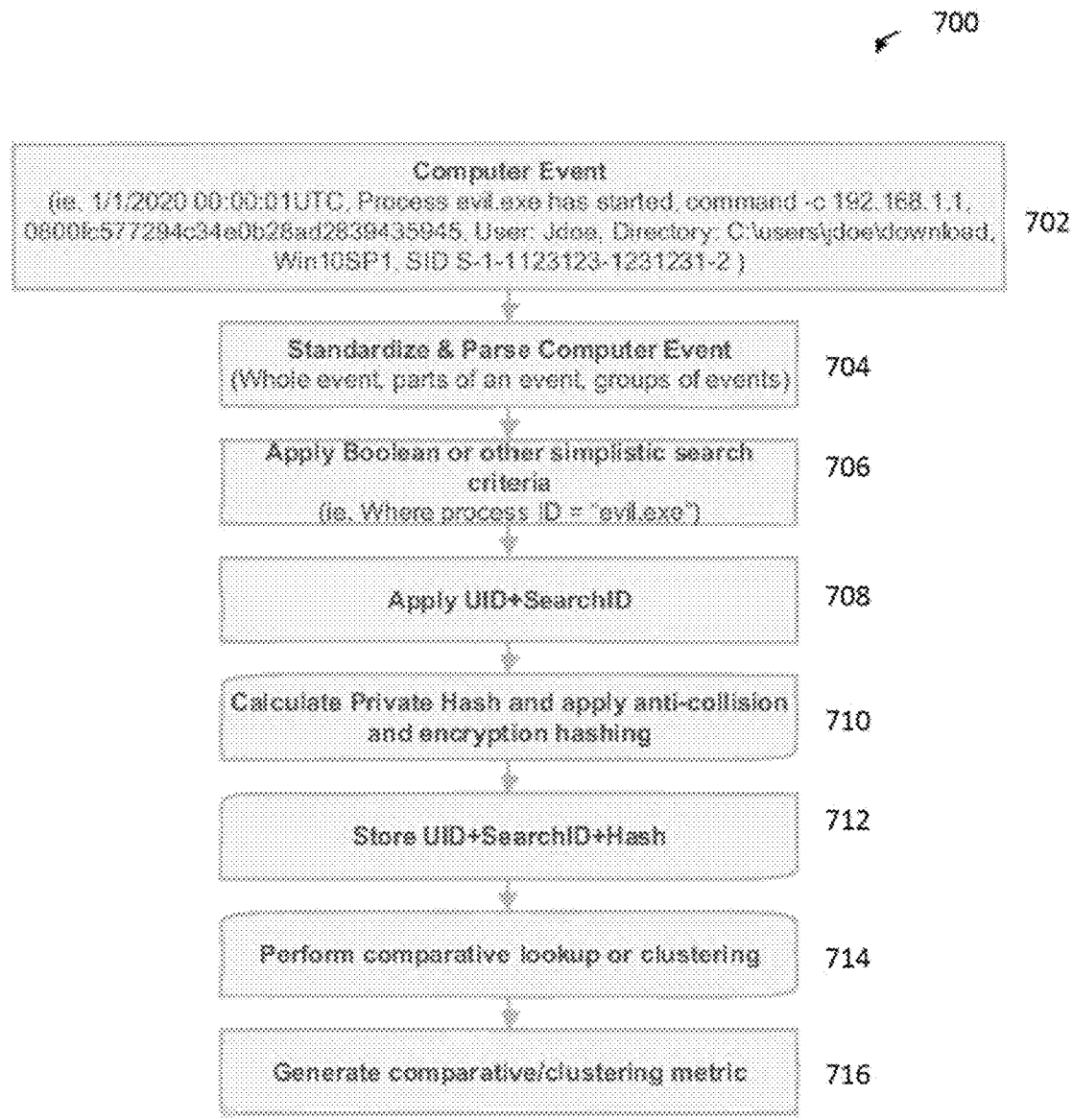
FIG. 7 shows a flow diagram depicting an example process for identifying commonality in computer events, according to an embodiment.

FIG. 7 shows a flow diagram depicting an example method 700 for identifying commonality in computer events, according to an example embodiment. The method 700 begins with 702, wherein the system detects that one or more computer events may be generated and collected. Next, the method 700 continues to 704, wherein the system may standardize and/or parse the collected computer events. In some implementations, 704 may be performed on the whole computer event data, parts of a computer event data, or groups of computer event data. At 704, the method 700 may facilitate universal recognition of values within computer event data that are pertinent in assigning weighted values and separating non relevant data. Next, the method 700 continues to 706, wherein the system applies search criteria to the standardized data. Examples of search criteria may include Boolean or other open-source threat intelligence platforms and languages.

Next, the method 700 may proceed to 708, wherein the system may apply unique ID (UID) and/or search ID to individual event data, portions of event data, or groups of event data. Step 708 may facilitate a "tie back" to the source data, i.e., the source data can be easily identified by the UID and search ID. Next, the method 700 may proceed to operation 710, wherein the system calculates a private hash value and/or applies anti-collision and encryption hashing. In some implementations, a custom algorithm or series of algorithms can be used to compute/calculate a fingerprint hash of the computer event(s), sub-event, or pre-determined event artifact and/or artifact actions in 710. In some implementations, the custom algorithm or the series of algorithms can include, for example, ball tree, closest pair of points problem, cluster analysis, content-based image retrieval, curse of dimensionality, digital signal processing, dimension reduction, fixed-radius near neighbors, Fourier analysis, instance-based learning, k-nearest neighbor algorithm, Linear least squares, LSH, MinHash, multidimensional analysis, nearest-neighbor interpolation, neighbor joining, principal component analysis, range search, similarity learning, singular value decomposition, sparse distributed memory, statistical distance, time series, Voronoi diagram, Wavelet, Lempel-Ziv Jaccard distance, bloom filter, SimHash, w-shingling, count-min sketch, concept mining, N-gram, k-mer, rolling hash, rabin fingerprint, vector space model, bag-of-words model, deep pairwise-supervised hashing, Facebook AI similarity search (Faiss), Winnowing and Rare-Chunk, symmetrical covariance matrix, etc. This may serve the purpose of (1) anonymizing sensitive information by encoding/encrypting the data while still allowing for comparative functions to take place later on; (2) reducing the storage of the originating data to a compressed and smaller data size; (3) optimizing and/or improving comparative operations for speed and scalability; (4) creating fingerprints that are both private and having metrics (similarity/clusters) that are not revealing of the underlying event data (without possessing originals). Examples of the fingerprinting comparative algorithms and clustering techniques can include: Ball tree, Closest pair of points problem, Cluster analysis, Content based image retrieval, Curse of dimensionality, Digital signal processing, Dimension reduction, Fixed-radius near neighbors, Fourier analysis, Instance-based learning, k-nearest neighbor algorithm, Linear least squares, Locality sensitive hashing, MinHash, Multidimensional analysis, Nearest neighbor interpolation, Neighbor joining, Principal component analysis, Range search, Similarity learning, Singular value decomposition, Sparse distributed memory, Statistical distance, Time series, Voronoi diagram, Wavelet, Lempel-Ziv Jaccard Distance, Bloom filter, SimHash, w-shingling, Count-min sketch, Concept mining, N-gram, k-mer, Rolling hash, Rabin fingerprint, Vector space model, Bag-of-words model, deep pairwise-supervised hashing, Facebook AI Similarity Search (Faiss), Winnowing and RareChunk, symmetrical covariance matrix, and the like.

Next, the method 700 continues to 712, wherein the system stores UID, search ID, and/or comparative hash value to a data store. In some implementations, the UID, search ID, and/or comparative hash value are stitched together to generate a universal ID for the underlying computer event. Next, the method 700 continues to 714, wherein the system may perform comparative lookup or clustering. The method 714 may compare the universal ID, UID, search ID, and/or comparative hash value to a common event metric that is generated from previous computer events. Outlier events can be identified quickly when using one or more of the universal ID, UID, search ID, and/or comparative hash value and investigation may be scheduled based on the amount of deviation from the common event metric. Next, the method 700 proceeds to 716, wherein the system generates a comparative/clustering metric. In some implementations, the non-outlier events may be further stored to the common event metric.

Figure 8:
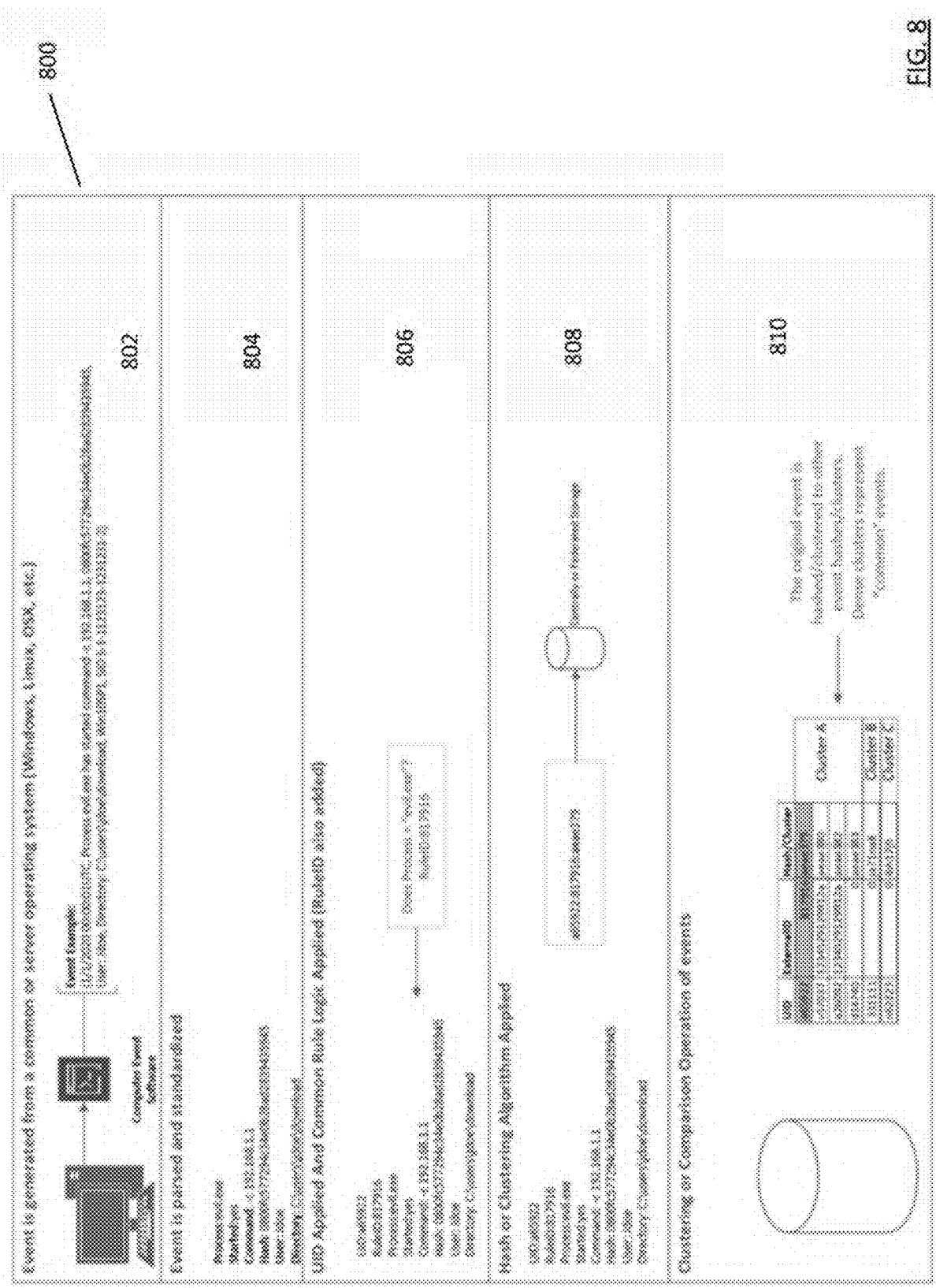
FIG. 8 shows a flow diagram depicting an example process for identifying commonality in computer events, according to an embodiment.

FIG. 8 shows a flow diagram depicting a method 800 for identifying commonality in computer events, according to an example embodiment. As depicted in FIG. 8, once the platforms and systems of the present disclosure are initialized, the method 800 begins with 802, wherein the system detects that one or more computer events may be generated and collected. Next, the method 800 continues to 804, wherein the system may standardize and/or parse the collected computer events. In some implementations, this operation 804 may be performed on the whole computer event data, parts of a computer event data, or groups of computer event data. Step 804 may facilitate universal recognition of values within computer event data is pertinent in assigning weighted values and separating non relevant data later on.

Next, the method 800 continues to 806, wherein the system applies UIS and common rule logic to the events, for example, to individual event data, portions of event data, or groups of event data. Step 806 may facilitate a "tie back" to the source data, i.e., the source data can be easily identified by the UID and search ID. Next, the method 800 may proceed to 808, wherein the system may apply hash function of a clustering algorithm to the computer events. In some implementations, a custom algorithm or series of algorithms can be used to compute/calculate a fingerprint hash value of the computer event(s), sub-event, or pre-determined event artifact and/or artifact actions in operation 808. This may serve the purpose of (1) anonymizing sensitive information by encoding/encrypting the data while still allowing for comparative functions to take place later on; (2) reducing the storage of the originating data to a compressed and smaller data size; (3) optimizing and/or improving comparative operations for speed and scalability; (4) creating and/or defining fingerprints that are both private and its metrics (similarity/clusters) are not revealing of the underlying event data (without possessing originals). Next, the method 800 may proceed to operation 810, wherein the system may perform clustering or comparison of the computer events. Step 810 may compare the universal ID, UID, search ID, and/or comparative hash to a common event metric that is generated from previous computer events. Outlier events can be identified quickly when using one or more of the universal ID, UID, search ID, and/or comparative hash and necessary investigation may be scheduled based on the amount of deviation from the common event metric.

In some embodiments, a method includes receiving, from a source from a plurality of sources, data associated with an event at the source. The data includes an event timestamp and an event data-frame. The method further includes defining a standardized event based on the event by parsing the data to map predefined data fields within the event data-frame based on predefined standardization rules, calculating a representative identifier for the event by providing a representation of the standardized event as an input to a predefined function, defining an identifier for the event based on the representative identifier, calculating a distance of the identifier to an identifier associated with each event cohort from a plurality of event cohorts, assigning the event to an event cohort from the plurality of event cohorts based on the distance meeting a criterion of that cohort, and identifying an anomalous event based on the distance exceeding a predetermined threshold.

In some implementations, the method further includes identifying a set of uncommon events based on a distance associated with a representative identifier of each event from the set of uncommon events not meeting a criterion of an event cohort from the plurality of event cohorts.

In some implementations, identifying the set of uncommon events includes identifying the set of uncommon events based on metadata associated with each event from the set of uncommon events.

In some implementations, calculating the distance is based on at least one of a cosine similarity, a hamming distance, a nearest neighbor search or a Euclidean distance.

In some implementations, calculating the distance is based on a locality sensitive hashing (LSH) function.

In some implementations, calculating the hash identifier includes tokenizing the standardized event to produce a tokenized event and providing the tokenized event to a word embedding model to define a vector representation of the event having a predetermined length. The vector representation of the event is the representation of the standardized event.

In some implementations, the predefined function is one of a hash function, a vector function, a tokenization function, or a feature function.

In some implementations, defining the identifier is based on at least one of a recurrent neural network (RNN) or a transformer.

In some embodiments a method includes receiving, from a plurality of sources, data associated with a plurality of events at the plurality of sources, standardizing the data based on a set of predefined standardization rules to define standardized data, defining a vector representation of the standardized data, transforming, by a machine learning model, the vector representation to define transformed data, sorting the transformed data using a coarse sorting process to define coarse sorted data, sorting the coarse sorted data using a fine sorting process to define fine sorted data, the fine sorted data defining a plurality of distances between data points of the fine sorted data, and based on the fine sorted data, identifying an anomalous event from the plurality of events.

In some implementations, the coarse sorting process includes using a locality sensitive hashing (LSH) function.

In some implementations, the method further includes applying a locality sensitive hashing (LSH) function on the standardized data prior to transforming the vector representation.

In some implementations the coarse sorting process includes using a WordPiece tokenization algorithm.

In some implementations, the fine sorting process includes using at least one of a cosine similarity, a hamming distance, a Euclidean distance, or a nearest neighbor search.

In some implementations, the machine learning model includes at least one of a neural network, reinforcement learning, a Bayesian network, a random forest, a support vector machine, or a decision tree.

In some implementations, defining the vector representation of the standardized data includes using word embedding.

In some implementations, the method further includes defining a plurality of scores based on the plurality of distances. Each score from the plurality of scores is associated with a respective event from the plurality of events.

In some implementations, a score from the plurality of scores is associated with a distance from the plurality of distances and between a first event from the plurality of events and a second event from the plurality of events and in the same event cohort as the first event.

In some implementations, a score from the plurality of scores is associated with a distance from the plurality of distances and between an event from the plurality of events and a cluster different than an event cohort associated with the event.

In some implementations, the method further includes performing a remedial action based on identifying the anomalous event. The remedial action can be at least one of identifying the anomalous event as indicative of malware, quarantining a file associated with the anomalous event, or restricting access to a device associated with the anomalous event.

In some embodiments, a non-transitory processor-readable medium stores code representing instructions to be executed by one or more processors. The instructions include code to cause the one or more processors to receive, from a plurality of sources, data associated with a plurality of events at the plurality of sources, standardize the data based on a set of predefined standardization rules to define standardized data, define a vector representation of the standardized data, transform, by a machine learning model, the vector representation to define transformed data, sort the transformed data using a coarse sorting process to define coarse sorted data and sort the coarse sorting data using a fine sorting process to define fine sorted data. The fine sorted data defines a plurality of distances between data points of the fine sorted data. The instructions further include code to, based on a distance from the plurality of distances and associated with an event from the plurality of events exceeding a threshold, quarantine an artifact associated with the event from the plurality of events.

In some implementations, the code further includes code to cause the one or more processors to identify a set of uncommon events based on a distance from the plurality of distances for each event from the set of uncommon events not meeting a criterion.

In some implementations, the criterion is associated with an event cohort from a plurality of event cohorts associated with the plurality of distances.

In some implementations, identifying the set of uncommon events includes identifying the set of uncommon events based on metadata associated with each event from the set of uncommon events.

In some implementations, the coarse sorting process includes using a locality sensitive hashing (LSH) function.

It should be understood that the disclosed embodiments are not intended to be exhaustive, and functional, logical, operational, organizational, structural and/or topological modifications may be made without departing from the scope of the disclosure. As such, all examples and/or embodiments are deemed to be non-limiting throughout this disclosure.

All definitions, as defined and used herein, should be understood to control over dictionary definitions, definitions in documents incorporated by reference, and/or ordinary meanings of the defined terms.

Examples of computer code include, but are not limited to, micro-code or micro-instructions, machine instructions, such as produced by a compiler, code used to produce a web service, and files containing higher-level instructions that are executed by a computer using an interpreter. For example, embodiments can be implemented using Python, Java, JavaScript, C++, and/or other programming languages and development tools. Additional examples of computer code include, but are not limited to, control signals, encrypted code, and compressed code.

The drawings primarily are for illustrative purposes and are not intended to limit the scope of the subject matter described herein. The drawings are not necessarily to scale; in some instances, various aspects of the subject matter disclosed herein can be shown exaggerated or enlarged in the drawings to facilitate an understanding of different features. In the drawings, like reference characters generally refer to like features (e.g., functionally similar and/or structurally similar elements).

The acts performed as part of a disclosed method(s) can be ordered in any suitable way. Accordingly, embodiments can be constructed in which processes or steps are executed in an order different than illustrated, which can include performing some steps or processes simultaneously, even though shown as sequential acts in illustrative embodiments. Put differently, it is to be understood that such features may not necessarily be limited to a particular order of execution, but rather, any number of threads, processes, services, servers, and/or the like that may execute serially, asynchronously, concurrently, in parallel, simultaneously, synchronously, and/or the like in a manner consistent with the disclosure. As such, some of these features may be mutually contradictory, in that they cannot be simultaneously present in a single embodiment. Similarly, some features are applicable to one aspect of the innovations, and inapplicable to others.

Where a range of values is provided, it is understood that each intervening value, to the tenth of the unit of the lower limit unless the context clearly dictates otherwise, between the upper and lower limit of that range and any other stated or intervening value in that stated range is encompassed within the disclosure. That the upper and lower limits of these smaller ranges can independently be included in the smaller ranges is also encompassed within the disclosure, subject to any specifically excluded limit in the stated range. Where the stated range includes one or both of the limits, ranges excluding either or both of those included limits are also included in the disclosure.

The phrase "and/or," as used herein in the specification and in the embodiments, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements can optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the embodiments, "or" should be understood to have the same meaning as "and/or" as defined above. For example, when separating items in a list, "or" or "and/or" shall be interpreted as being inclusive, i.e., the inclusion of at least one, but also including more than one of a number or list of elements, and, optionally, additional unlisted items. Only terms clearly indicated to the contrary, such as "only one of" or "exactly one of," or, when used in the embodiments, "consisting of," will refer to the inclusion of exactly one element of a number or list of elements. In general, the term "or" as used herein shall only be interpreted as indicating exclusive alternatives (i.e., "one or the other but not both") when preceded by terms of exclusivity, such as "either," "one of" "only one of," or "exactly one of." "Consisting essentially of," when used in the embodiments, shall have its ordinary meaning as used in the field of patent law.

As used herein in the specification and in the embodiments, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements can optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the embodiments, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

Some embodiments described herein relate to a computer storage product with a non-transitory computer-readable medium (also can be referred to as a non-transitory processor-readable medium) having instructions or computer code thereon for performing various computer-implemented operations. The computer-readable medium (or processor-readable medium) is non-transitory in the sense that it does not include transitory propagating signals per se (e.g., a propagating electromagnetic wave carrying information on a transmission medium such as space or a cable). The media and computer code (also can be referred to as code) can be those designed and constructed for the specific purpose or purposes. Examples of non-transitory computer-readable media include, but are not limited to, magnetic storage media such as hard disks, floppy disks, and magnetic tape; optical storage media such as Compact Disc/Digital Video Discs (CD/DVDs), Compact Disc-Read Only Memories (CD-ROMs), and holographic devices; magneto-optical storage media such as optical disks; carrier wave signal processing modules; and hardware devices that are specially configured to store and execute program code, such as Application-Specific Integrated Circuits (ASICs), Programmable Logic Devices (PLDs), Read-Only Memory (ROM) and Random-Access Memory (RAM) devices. Other embodiments described herein relate to a computer program product, which can include, for example, the instructions and/or computer code discussed herein.

Some embodiments and/or methods described herein can be performed by software (executed on hardware), hardware, or a combination thereof. Hardware modules may include, for example, a processor, a field programmable gate array (FPGA), and/or an application specific integrated circuit (ASIC). Software modules (executed on hardware) can include instructions stored in a memory that is operably coupled to a processor and can be expressed in a variety of software languages (e.g., computer code), including C, C++, Java™, Ruby, Visual Basic™, and/or other object-oriented, procedural, or other programming language and development tools. Examples of computer code include, but are not limited to, micro-code or micro-instructions, machine instructions, such as produced by a compiler, code used to produce a web service, and files containing higher-level instructions that are executed by a computer using an interpreter. For example, embodiments may be implemented using imperative programming languages (e.g., C, Fortran, etc.), functional programming languages (Haskell, Erlang, etc.), logical programming languages (e.g., Prolog), object-oriented programming languages (e.g., Java, C++, etc.) or other suitable programming languages and/or development tools. Additional examples of computer code include, but are not limited to, control signals, encrypted code, and compressed code.

What is claimed is:

1. A method, comprising:
receiving, from a source from a plurality of sources, data associated with an event at the source, the data including an event timestamp and an event data-frame;
defining a standardized event based on the event by parsing the data to map predefined data fields within the event data-frame based on predefined standardization rules;
tokenizing the standardized event to produce a tokenized event;
providing the tokenized event to a word embedding model to define a vector representation of the event having a predetermined length, the vector representation of the event being a representation of the standardized event;
calculating a representative identifier for the event by providing the representation of the standardized event as an input to a predefined function;
defining an identifier for the event based on the representative identifier;
calculating a distance of the identifier to an identifier associated with each event cohort from a plurality of event cohorts;
assigning the event to an event cohort from the plurality of event cohorts based on the distance meeting a criterion of that cohort; and
identifying an anomalous event based on the distance exceeding a predetermined threshold.

2. The method of claim 1, further comprising:
identifying a set of uncommon events based on a distance associated with a representative identifier of each event from the set of uncommon events not meeting a criterion of an event cohort from the plurality of event cohorts.

3. The method of claim 2, wherein the identifying the set of uncommon events includes identifying the set of uncommon events based on metadata associated with each event from the set of uncommon events.

4. The method of claim 1, wherein the calculating the distance is based on at least one of a cosine similarity, a hamming distance, a nearest neighbor search or a Euclidean distance.

5. The method of claim 1, wherein the calculating the distance is based on a locality sensitive hashing (LSH) function.

6. The method of claim 1, wherein the predefined function is one of a hash function, a vector function, a second tokenization function, or a feature function.

7. The method of claim 1, wherein the defining the identifier is based on at least one of a recurrent neural network (RNN) or a transformer.

8. A method, comprising:
receiving, from a plurality of sources, data associated with a plurality of events at the plurality of sources;
standardizing the data based on a set of predefined standardization rules to define standardized data;
tokenizing the standardized data to produce tokenized data;
providing the tokenized data to a word embedding model to define a vector representation of the standardized data having a predetermined length;
transforming, by a machine learning model, the vector representation to define transformed data;
sorting the transformed data using a coarse sorting process to define coarse sorted data;
sorting the coarse sorted data using a fine sorting process to define fine sorted data, the fine sorted data defining a plurality of distances between data points of the fine sorted data; and
based on the fine sorted data, identifying an anomalous event from the plurality of events.

9. The method of claim 8, wherein the coarse sorting process includes using a locality sensitive hashing (LSH) function.

10. The method of claim 8, wherein the method further includes:
applying a locality sensitive hashing (LSH) function on the standardized data prior to transforming the vector representation.

11. The method of claim 8 wherein the coarse sorting process includes using a WordPiece tokenization algorithm.

12. The method of claim 8, wherein the fine sorting process includes using at least one of a cosine similarity, a hamming distance, a Euclidean distance, or a nearest neighbor search.

13. The method of claim 8, wherein the machine learning model includes at least one of a neural network, reinforcement learning, a Bayesian network, a random forest, a support vector machine or a decision tree.

14. The method of claim 8, further comprising:
defining a plurality of scores based on the plurality of distances, each score from the plurality of scores associated with a respective event from the plurality of events.

15. The method of claim 14, wherein a score from the plurality of scores is associated with a distance from the plurality of distances and between a first event from the plurality of events and a second event from the plurality of events and in the same event cohort as the first event.

16. The method of claim 14, wherein a score from the plurality of scores is associated with a distance from the plurality of distances and between an event from the plurality of events and a cluster different than an event cohort associated with the event.

17. The method of claim 8, further comprising:
performing a remedial action based on identifying the anomalous event, the remedial action being at least one of identifying the anomalous event as indicative of malware, quarantining a file associated with the anomalous event, or restricting access to a device associated with the anomalous event.

18. A non-transitory processor-readable medium storing code representing instructions to be executed by one or more processors, the instructions comprising code to cause the one or more processors to:
receive, from a plurality of sources, data associated with a plurality of events at the plurality of sources;
standardize the data based on a set of predefined standardization rules to define standardized data;

tokenize the standardized data to produce tokenized data;
provide the tokenized data to a word embedding model to define a vector representation of the standardized data having a predetermined length;
transform, by a machine learning model, the vector representation to define transformed data;
sort the transformed data using a coarse sorting process to define coarse sorted data;
sort the coarse sorted data using a fine sorting process to define fine sorted data, the fine sorted data defining a plurality of distances between data points of the fine sorted data; and
based on a distance from the plurality of distances and associated with an event from the plurality of events exceeding a threshold, quarantine an artifact associated with the event from the plurality of events.

19. The non-transitory processor-readable medium of claim 18, wherein the code further comprises code to cause the one or more processors to:

identify a set of uncommon events based on a distance from the plurality of distances for each event from the set of uncommon events not meeting a criterion.

20. The non-transitory processor-readable medium of claim 19, wherein the criterion is associated with an event cohort from a plurality of event cohorts associated with the plurality of distances.

21. The non-transitory processor-readable medium of claim 19, wherein identifying the set of uncommon events includes identifying the set of uncommon events based on metadata associated with each event from the set of uncommon events.

22. The non-transitory processor-readable medium of claim 18, wherein the coarse sorting process includes using a locality sensitive hashing (LSH) function.

* * * * *